(12) United States Patent
Bouwens et al.

(10) Patent No.: US 8,209,904 B2
(45) Date of Patent: Jul. 3, 2012

(54) METHOD OF GROWING PLANTS

(75) Inventors: Paul Jacques Louis Hubert Bouwens, Vught (NL); Eelke Gjalt Hempenius, Deest (NL)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 13/003,107

(22) PCT Filed: Jul. 9, 2009

(86) PCT No.: PCT/EP2009/004996
§ 371 (c)(1),
(2), (4) Date: Mar. 28, 2011

(87) PCT Pub. No.: WO2010/003677
PCT Pub. Date: Jan. 14, 2010

(65) Prior Publication Data
US 2011/0167726 A1   Jul. 14, 2011

(30) Foreign Application Priority Data

Jul. 10, 2008   (EP) .................................... 08252347

(51) Int. Cl.
*A01G 31/00* (2006.01)
(52) U.S. Cl. ........................................... 47/59 S
(58) Field of Classification Search ............ 47/59 S, 47/62 E, 62 N, 73, 75, 77, 80, 81, 86
See application file for complete search history.

(56) References Cited

U.S. PATENT DOCUMENTS

| | | | |
|---|---|---|---|
| 5,009,031 A * | 4/1991 | Knop et al. | 47/64 |
| 5,133,151 A * | 7/1992 | Blok | 47/64 |
| 2005/0081440 A1 * | 4/2005 | Sauvage et al. | 47/62 A |
| 2011/0167726 A1 * | 7/2011 | Bouwens et al. | 47/59 S |

FOREIGN PATENT DOCUMENTS

| | | |
|---|---|---|
| DE | 2013352 A1 | 10/1971 |
| GB | 1 296 746 A | 11/1972 |
| GB | 1 318 736 A | 5/1973 |
| GB | 1318736 A * | 5/1973 |
| NL | 8502065 A | 2/1987 |
| WO | WO-85/03191 A1 | 8/1985 |
| WO | WO9213441 * | 8/1992 |
| WO | WO-96/03858 A1 | 2/1996 |
| WO | WO-2008/009467 A1 | 1/2008 |

* cited by examiner

*Primary Examiner* — Frank T Palo

(74) *Attorney, Agent, or Firm* — Tarolli, Sundheim, Covell & Tummino LLP

(57) ABSTRACT

A method of growing a fruit or vegetable crop comprises: positioning a plant in the form of a seed or a seedling or a cutting of the crop in a first coherent mineral wool growth substrate having a volume not more than 150 cm$^3$, allowing the plant to root and grow for at least 2 days and not more than 30 days, then transferring the plant within the first coherent mineral wool growth substrate so that the first coherent mineral wool growth substrate is in contact with a second coherent mineral wool growth substrate having volume 60 to 1500 cm$^3$, and allowing the plant to grow for a further 2 to 5 weeks, transferring the plant within the second coherent mineral wool growth substrate so that the second coherent mineral wool growth substrate is in contact with a third coherent mineral wool growth substrate having volume of from 700 to 45 000 cm$^3$, and allowing the plant to grow for a further 1 to 7 weeks before any further transfer is effected.

12 Claims, No Drawings

METHOD OF GROWING PLANTS

FIELD OF THE INVENTION

The invention relates to methods of growing plants, in particular fruit and vegetable crops, using mineral wool growth substrates.

BACKGROUND OF THE INVENTION

It has been well known for many years to propagate seeds, seedlings and cuttings for fruit and vegetable crops in growth substrates formed from mineral wool. Once the plants have rooted and developed leaves in a first growth substrate, they are usually transferred to a second growth substrate.

It is conventional for the growing process to be started at a propagator's facility and then the propagator transfers the plants at an appropriate stage to a grower's facility where the growing process is completed and the crop harvested.

Currently vegetable plants are normally propagated in a first growth substrate which is relatively small in volume (a plug) and then transferred to a larger second growth substrate (a block) and grown for a further period, after which they can then be transferred to the grower, where the second growth substrates are positioned on slabs of growth substrate for further growth.

The dimensions of the essentially cylindrical plug have traditionally been around height 2.5 cm, diameter 2 cm. The dimensions of the block have traditionally been around width 10 cm, length 10 cm, height 6.5 cm. The dimensions of the slabs vary according to the crop being grown but usually have height 7.5 cm.

They are normally at least 100 cm in length and at least 12 cm in width.

The current system means that the propagator is responsible for the plants for around 4 to 9 weeks (depending on crop type and time of year) and then the grower is responsible for them for a considerable period of weeks before a harvestable crop is generated. The grower then has to supply energy, water, nutrients, etc for all of this time. In practice, this means that a grower often does not make any profit from crops during this first stage. The long period of time for which the grower is responsible for the plants before a harvestable crop is generated also means that it is more difficult for the grower to time a crop to match specific times of year when the relevant crop is particularly required.

This traditional system has been used for many years for propagating and growing fruits and vegetables throughout the growing industry, in essentially the same form, despite these disadvantages.

It would be desirable to provide a growing method which allows ultimately better root and shoot development and hence a better quality of vegetable crop and which can also lead to a harvestable crop in a shorter period of time.

Particular problems arise when a growth substrate is to be used for propagation. For optimum propagation of the plants being grown, propagators would ideally like to supply water frequently to the substrate. Unfortunately, this has a problem that the growth substrate then becomes too wet and this has a negative effect on the growth of the plants, especially because in periods of low light intensity it can result in a high risk of disease.

Accordingly, it would be desirable to provide a propagation and growing method which alleviates these disadvantages.

NL8502065 describes a traditional growing system, corresponding to that described above, in which small plugs (dimensions 2.5 cm high and 2 cm in diameter) are used for germination of seedlings. The dimensions of the plug are chosen to enable automated sowing by machine during propagation and its density is chosen to be in the range 60 to 90 kg/m$^3$ so as to allow penetration of the first roots into the plug material. After germination, the plug is positioned in a cut-out in a block for further growth of the seedling and then after further cultivation the block can be positioned on a mat for further growth of the plant. The dimensions of the block are not discussed.

SUMMARY OF THE INVENTION

According to the invention, we provide a method growing a fruit or vegetable crop comprising:

positioning a plant in the form of a seed or a seedling or a cutting of the crop in a first coherent mineral wool growth substrate having a volume not more than 150 cm$^3$, allowing the plant to root and grow for at least 2 days and not more than 30 days, then transferring the plant within the first coherent mineral wool growth substrate so that the first coherent mineral wool growth substrate is in contact with a second coherent mineral wool growth substrate having volume 60 to 1500 cm$^3$, and allowing the plant to grow for a further 2 to 5 weeks, transferring the plant within the second coherent mineral wool growth substrate so that the second coherent mineral wool growth substrate is in contact with a third coherent mineral wool growth substrate having volume of from 700 to 45 000 cm$^3$, and allowing the plant to grow for a further 1 to 7 weeks before any further transfer is effected.

We find that use of this system means that much greater root and shoot development can be obtained at the stage when the propagator is responsible for the plants (taking a longer time) and when the plant is given to the grower, far less work is required by the grower and there is less time to wait before the plant is ready for harvest. Furthermore, this is not just a question of changing the responsibility for the same steps. Instead, the overall period from seed/seedling/cutting to final harvest is shorter and the overall number of action steps that must be taken is reduced.

This is beneficial in that the grower can then make a profit in the first year and hence also has the opportunity to change to a different crop at an earlier stage.

It is also easier to control the point at which the crops are harvestable.

DETAILED DESCRIPTION OF THE INVENTION

In general, in the invention, the propagator is responsible for growth of the plants in the first coherent mineral wool substrate before transfer to the second coherent mineral wool growth substrate, and during growth in the second coherent mineral wool substrate and the transfer to the third coherent mineral wool substrate and for an extended period after that transfer. Because of the choice in the invention of the sizes of the second and third mineral wool growth substrates, it is possible for the propagator to retain responsibility for the plants for a much greater period of time than with the traditional method.

The method of the invention leads to an increased root volume which supports a better fruit setting and load. This will reduce loss of fruits in the first setting and it also increases quality of the fruit. When the root system is bigger, as in the invention, it simply reduces risk of loss and reduces risk of low quality of fruit regardless of the climatical conditions at that particular time of the year. Because of having a stronger root system in the beginning, the plant will continue growing without disruption periods in growing because it is stronger and more tolerant of different climatical conditions. The plant does not have to invest in energy for root development but more for maintenance. So there will be more energy left for development of fruits and leaves.

With the system of the invention, the choice of the dimensions of the growth substrates, especially the second and third growth substrates, means that the rate of root growth is optimized, especially in the second and third growth substrates. This is believed to be partly due to the volume chosen for the growth substrates and partly due to the resulting ability to irrigate more frequently than in the traditional system. As a result, growth rate is increased. This means that the propagator has an opportunity to introduce more than one selection stage. In the traditional system, it is normal for the propagator to select at the point when the plants growing in the traditional blocks are to be transferred to the grower. At this point, plants of insufficiently high quality are not transferred but are instead discarded. In the system of the invention, a selection stage can be included at the point where the plant, in the first coherent mineral wool growth substrate, is transferred to the second coherent mineral wool growth substrate. Importantly, a further selection stage can be introduced at the point where the plant, in the second coherent mineral wool growth substrate, is transferred to the third coherent mineral wool substrate. If desired, a further selection step can be included at the point where the plants are transferred to the growers facility. With the traditional system, it would not be possible simply to add a selection stage at some earlier point than the transfer, in the propagation block, from the propagator's facility to a slab at the growers facility, because selection of plants is only effective after sufficient growth has occurred. Prior to that, it is not possible to tell with sufficient reliability whether or not a plant is of inferior quality. The increased rate of growth that arises from the method of the invention allows earlier and more frequent selection to be effective.

It should be noted that the reason why traditional propagation and final growing take place at different facilities, and still preferably do in the invention, is partly because the expertise required for growing early stage plants is different from that required for growing late stage plants, and partly because the conditions required for propagation are not the same as the conditions required for the final growing stage. For instance, a propagator can propagate a large number of plants in a relatively small area or greenhouse and thus with relatively low energy costs. Propagation is commonly carried out using ebb/flood irrigation. In contrast, the final growing stages should be carried out in a much greater area of greenhouse, thus resulting in much higher energy costs. The system of the invention, which allows this stage up to the first harvest to be shortened, thus can lead to greatly reduced energy costs in the overall growing process.

The choice of the dimensions of the third mineral wool growth substrate means that the plants can stay in or on this substrate until they are harvestable, without the need for the grower to provide an additional substrate such as a slab.

Because the plants come to harvestable condition at an earlier stage after growing is initiated, the grower has the opportunity to harvest further crops from the same set of plants in the same time as the traditional system allows one crop to be harvested. For instance, the grower can harvest an additional 3 to 5 kg/m$^2$ per year with the use of the invention.

The invention is concerned with growth of fruit and vegetable crops, that is, plants that are grown for fruit and vegetables. It is the fruit/vegetables that are harvested and ultimately sold. Preferred crops include tomato, pepper, cucumber and eggplant.

The plant is incorporated into the first mineral wool growth substrate.

The first coherent mineral wool growth substrate can be formed of glass wool or slag wool but is usually stone wool. Stone wool generally has a content of iron oxide at least 3% and alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general, it can be any of the types of man-made vitreous fibre which are conventionally known for production of growth substrates. Fibre diameter is often in the range 3 to 20 microns, in particular 5 to 10 microns, as conventional.

The growth substrate is in the form of a coherent mass. That is, the growth substrate is generally a coherent matrix of mineral wool fibres, which has been produced as such, but can also be formed by granulating a slab of mineral wool and consolidating the granulated material.

The mineral wool growth substrate usually comprises a binder, often an organic binder, which is generally heat-curable. The growth substrate is preferably a coherent matrix of mineral fibres connected by cured binder. The binder can be an organic hydrophobic binder, and in particular, it can be a conventional heat-curable (thermosetting), hydrophobic binder of the type which has been used for many years in mineral wool growth substrates (and other mineral wool based products). This has the advantage of convenience and economy. Thus, the binder is preferably a phenol formaldehyde resin or urea formaldehyde resin, in particular phenol urea formaldehyde (PUF) resin. It can be a formaldehyde free binder such as a polyacrylic acid based binder or an epoxy based binder.

The binder is generally present in the first coherent mineral wool growth substrate in amounts of from 0.1 to 10% based on the substrate, usually 0.5 to 5%, most preferably 1.5 to 5%.

The mineral wool growth substrate preferably also comprises a wetting agent. This can be a conventional wetting agent such as a non-ionic surfactant. Alternatively, it can be an ionic surfactant, preferably an anionic surfactant. For instance, it can be any of the ionic surfactants described in our publication WO2008/009467.

The wetting agent is present in the first mineral wool growth substrate in amounts preferably from 0.01 to 3% (by weight), based on growth substrate, more preferably 0.05 to 1%, in particular, 0.075 to 0.5%.

Preferably, the amount (by weight) of wetting agent based on the weight of binder (dry matter) is in the range 0.01 to 5%, preferably 0.5 to 4%.

The first mineral wool growth substrate may contain other types of conventional additives in addition to binder and wetting agent, for instance salts such as ammonium sulphate and adhesion promoters such as silanes.

Density of the first mineral wool growth substrate can be up to 200 kg/m$^3$ but is generally in the range 10 to 150 kg/m3, often in the range 30 to 100 kg/m$^3$, preferably in the range 35 to 90 kg/m$^3$. It can be at least 45 kg/m$^3$.

Preferably the fibres are arranged predominantly in the vertical direction. This has the advantage of allowing better root growth than other orientations and enables the provision of a robust substrate which is useful during transplantation to the next stage.

The first mineral wool growth substrate has a volume up to 150 cm$^3$. Preferably, it is not more than 100 cm$^3$, and more preferably is not more than 80 cm$^3$, most preferably not more than 70 cm$^3$. In particular, it is most preferably in the range 10 to 40 cm$^3$.

Preferably, the height is not more than 7.5 or 8 cm, in particular not more than 7 cm. Preferably, the width (herein, the minimum cross-dimension at the top surface of the substrate when oriented as for use) is not more than 6 cm and in particular not more than 5 or not more than 4 cm and the length (herein, cross-dimension perpendicular to the width direction) is not more than 6 cm and in particular not more than 5 or not more than 4 cm. Preferably, these cross-dimensions are each not more than 2.5 cm, and preferably the height is not more than 3 cm.

The first mineral wool growth substrate may be cylindrical or cubic or cuboid in shape but is preferably frustoconical, with the wider end at the top surface in use.

In the method, plants are positioned in the mineral wool growth substrate for growth. More than one plant may be positioned in a single unit of first mineral wool growth substrate but preferably each unit has only one plant.

Usually the first mineral wool growth substrate will have a cut-out for the (or each) plant to be positioned in it. This may be substantially cylindrical or substantially conical or a combination of a top section which is frustoconical and a lower section which is substantially cylindrical.

Prior to positioning the plants in the first mineral wool growth substrate the substrate is preferably watered, for instance by soaking for about 12 hours or more, after which the plants are added.

The plants are grown in the first mineral wool growth substrate for at least 2 days. They can be grown in this substrate for at least 8 days and in some cases at least 10 days, or even at least 14 days. They can be grown in this substrate for up to 30 days, but normally not more than 24 days and preferably not more than 2 weeks.

The exact period of growth in the first growth substrate can depend on the form of the plant as well as the species. It can be in the form of a seed, seedling or cutting.

One specific form of preparation of a plant grown from a seed is known as an understock for a grafted plant. The initial plant is grown from a seed to generate strong rootstock (which is less susceptible to diseases). However, where the quality of the final crop is desired to be higher than would be achieved from a plant with such strong rootstock then the plant is cut whilst in the first growth substrate, leaving the lower part of the plant in the substrate. The scion (stem plus lobes) from another plant, which would give rise to a better quality final crop, is joined to the understock, generally using a silicon (or other) clip. Such forms are often grown for the longest periods in the first growth substrate, for around 6 to 8 days after the joining step takes place.

Other forms of plant are often grown in the first substrate for a shorter period before transfer to the second growth substrate, for instance up to 24 days or up to 18 days.

The plants are irrigated with water and nutrients. The use of ionic surfactant has the advantage that loss of the wetting agent to the irrigation water is minimal, allowing for a system in which there is essentially no anti foam material in the irrigation water.

Non-conventional irrigation methods can be used, specifically irrigation can be from the base of the substrate. Thus, tidal irrigation can be used. A growth substrate can be placed for irrigation in a container passing through a gutter. Alternatively, conventional irrigation methods can be used in the invention, such as top irrigation.

In the invention, the plants are grown in the first mineral wool growth substrate and then transferred to the second mineral wool growth substrate. This is normally done after the plants have germinated.

Prior to positioning the first mineral wool growth substrate in contact with the second mineral wool growth substrate, the second substrate is preferably watered, for instance by soaking for about 12 hours or more, after which the first mineral wool growth substrate is added.

This second mineral wool growth substrate has volume of from 60 cm$^3$ to 1500 cm$^3$. It is usually larger than the first mineral wool growth substrate and often has volume at least 70 cm$^3$, and can be at least 110 cm$^3$. Preferably, it is not more than 500 cm$^3$, in particular not more than 200 cm$^3$.

The use of a small volume second mineral wool growth substrate (relative to the standard blocks used as second mineral wool growth substrate in the traditional method) has a number of advantages. This means that it is possible to water the substrate more often without saturating it. As a result, the increased evaporation has the effect that more oxygen can penetrate into the substrate, enabling the roots to develop better and faster.

The choice of a relatively small second mineral wool growth substrate appears to enable a particular watering and treatment pattern which allows better root development at this stage.

It is believed that the use of a small second growth substrate allows the use of frequent watering (for instance at least once every 3 days, preferably at least once every 2 days, and can be daily) without reducing oxygen in the second growth substrate to a disadvantageous level.

As a result of using a small second mineral wool growth substrate, which enables a beneficial watering pattern, the root growth within the second substrate is higher and better than root growth in a system using a larger second growth substrate (traditional block).

Preferably the height of the second growth substrate is in the range 4 to 10 cm, especially in the range 5 to 8 cm. Preferably it has width and length (independently) in the range 3 to 10 cm, in particular in the range 4 to 7 cm.

The second coherent growth substrate can be in various forms, for instance conical, frustoconical, cylindrical, rectangular prism or cubic.

In its other characteristics than its dimensions the second mineral wool growth substrate can, independently, have the preferred characteristics discussed above for the first mineral wool growth substrate.

It is particularly valuable for the second coherent mineral wool substrate to contain the ionic wetting agent mentioned above, as this contributes to better aeration in the substrate.

The transfer to the second mineral wool growth substrate is effected by positioning the first mineral wool growth substrate, containing the plant, in contact with the second mineral wool growth substrate. This can be done simply by positioning the first mineral wool growth substrate on the top surface of the second mineral wool growth substrate. However, in a preferred method each first mineral wool growth substrate is placed within a cut-out in a second mineral wool growth substrate. This has the advantage of providing a system which is physically stable and easy to move and also allows more rapid root development within the second mineral wool growth substrate. Positioning the first mineral wool growth substrate inside a cut-out in the second mineral wool growth substrate is also believed to have an advantage generated by causing some minor damage to the exposed roots, which leads to their more rapid regeneration during rooting-in.

The first mineral wool growth substrate can be placed in contact with the second mineral wool growth substrate in the same orientation as it was during its first growth stage, or at 90 degrees or even at 180 degrees to that orientation (in these cases the shoot is positioned so that it is oriented upwards).

It is desirable for the first mineral wool growth substrate to fit closely into the cut-out in the second mineral wool growth substrate. The adjacent surfaces are preferably in contact over a high proportion of their area. This maximizes the advantages mentioned above. Preferably, the side and bottom surfaces of the cut-out in the second mineral wool growth substrate are generally contiguous with at least 35%, in particular at least 50%, preferably at least 90%, of the area of the surfaces of the first mineral wool growth substrate other than the top surface.

Each unit of second mineral wool growth substrate can contain one or more units of first mineral wool growth substrate, each of these units of first mineral wool growth substrate preferably containing one plant.

The plants are then allowed to grow in this situation for at least 2 weeks, and up to 4 or 5 weeks.

In the invention the plants are grown in the second mineral wool growth substrate and then transferred to the third mineral wool growth substrate.

Prior to positioning the second mineral wool growth substrate in contact with the third mineral wool growth substrate, the third substrate is preferably watered, for instance by soaking for about 12 hours or more, after which the second mineral wool growth substrates are added.

This third mineral wool growth substrate has volume of from 700 $cm^3$ to 45 000 $cm^3$. It is larger than the second mineral wool growth substrate and often has volume at least 750 $cm^3$, preferably at least 1000 $cm^3$. Volume is preferably not more than 30 000 $cm^3$, more preferably not more than 20 000 $cm^3$. In particular, it is not more than 8000 $cm^3$.

The third substrate preferably has height from 6.5 to 20 cm. In particular, the height is at least 10 cm. This assists in provided an aerated substrate to maximize root growth. Preferably, the third substrate has width from 10 to 30 $cm^3$ and preferably has length from 15 to 75 cm (all dimensions being defined as above). A length in the range 20 to 30 cm in combination with a width in the range 16 to 24 cm is useful, as is a length in the range 30 to 50 cm in combination with a width in the range 10 to 15 cm.

In its other characteristics than its dimensions, the third mineral wool growth substrate can, independently, have the preferred characteristics discussed above for the first and second mineral wool growth substrates.

It is particularly valuable for the third coherent mineral wool substrate to contain the ionic wetting agent mentioned above, as this contributes to better aeration in the substrate.

The transfer to the third mineral wool growth substrate is effected by positioning the second mineral wool growth substrate, containing the plant(s), in contact with the third mineral wool growth substrate. This can be done simply by positioning the second mineral wool growth substrate on the top surface of the third mineral wool growth substrate. However, it is preferably done by placing each second mineral wool growth substrate within a cut-out in a third mineral wool growth substrate.

If cut-outs in the third substrate are used, it is desirable for the second mineral wool growth substrate to fit closely into the cut-out in the third mineral wool growth substrate, as discussed in connection with the first and second growth substrates. In this case, the second growth substrate is normally positioned in contact with the third growth substrate in the same orientation as it had during the period of growth in the second growth substrate.

Each unit of third mineral wool growth substrate can be in contact with one or more units of second mineral wool growth substrate, preferably more than one.

The plants are then allowed to grow in this situation for at least 1 week, and up to 7 weeks, often up to 5 weeks. The precise length of time will depend on the crop type and the time of year.

Preferably, the combination of one unit of third mineral wool growth substrate and however many second mineral wool growth substrates are in contact with it are wrapped in polymeric film, usually surrounding the sides, bottom surface and top surface and allowing the plant or plants to protrude from the top. This is helpful for transport from one facility to another.

When the units of third mineral wool growth substrate are wrapped in polymeric film they usually contain one or more drainage holes in the film to allow drainage of water. Preferably, there are two in each unit of third mineral wool growth substrate.

Each third mineral wool growth substrate can contain any appropriate number of cut-outs, depending upon the crop type and the conditions, for containing a single second mineral wool growth substrate in each cut-out. For instance there can be up to 14 cut-outs, in particular up to 6. As one example, two cut-outs for plants in second mineral wool growth substrate can be positioned at diagonally opposite corners. Multiple cut-outs can be positioned rectangularly. If there is a single cut-out it is generally placed substantially centrally in the top surface.

Preferably, each unit of third mineral wool growth substrate will also contain one or more (but preferably one) irrigation holes.

Generally each unit of third mineral wool growth substrate is cuboid.

When positioned in the third mineral wool growth substrate, the plants are irrigated. It is believed that the dimensions of the second growth substrate allow the use of frequent watering at the propagation stage (for instance at least once every 3 days, preferably at least once every 2 days, and can be daily and even twice daily) without reducing oxygen in the third growth substrate to a disadvantageous level. At the grower's facility watering may be even more frequent.

As a result of the chosen dimensions of the third mineral wool growth substrate, which enables a beneficial watering pattern, the root growth within the third substrate is higher and better than root growth in a traditional system.

In the invention at least one plant is grown. Generally, a plurality of plants are grown, in particular at least 10 or at least 30 or most often at least 50, preferably at least 100.

In the method of the invention, it is preferred that there is at least one, preferably at least two, and more preferably, at least three selection steps. In this embodiment a plurality of plants are being grown. The operator of the method determines the quality of plants that will be required for transfer to the next stage. Plants having insufficiently high quality are not transferred but are instead discarded.

Preferably, there is a selection step prior to transfer of the first mineral wool growth substrates to the second mineral wool growth substrate. Preferably, there is a selection step prior to transfer of the second mineral wool growth substrates to the third mineral wool growth substrate. Preferably, there is a selection step prior to transfer of the third mineral wool growth substrates to the grower's facility.

The method of the invention allows a larger proportion of the growing process leading to the first crop to be carried out in one facility, namely that of the propagator. For instance, growth at the propagator's facility can be carried out for at least 2, 3, or 4 weeks, in particular at least 5 or at least 6 weeks. The root development in the invention is, we find, better than in the traditional system and hence more growth occurs in this period of time than in the same period of time using the traditional system. This means that when the plants are transferred to the grower there is a much shorter time than is conventional until a harvestable crop is available.

The mineral wool growth substrates can be made in conventional manner. That is, they can be made by providing solid mineral raw materials, melting these raw materials to form a melt and forming the melt into fibres, collecting the fibres as a primary web and consolidating the collected fibres. A binder is, conventionally, usually added by spraying on to the fibres after formation but before collection and consolidation. In the invention, the binder is usually a curable binder and is normally cured as the consolidated product passes through a curing oven. After this the product is cut into the desired sizes.

Curing is normally in an oven at a temperature of around 200° C. or greater, often at least 220 C, for instance in the range of 220 to 275 or up to 290 C. Examples of curing temperatures are 225, 240 and 250 C.

Binder is usually applied to the fibres by spraying of a solution of the binder components in finely divided/atomized form.

Wetting agent is also generally applied to the fibres as an atomised/finely divided spray, usually as a solution or dispersion, but can be in neat form if the wetting agent is itself a liquid.

Wetting agent and binder may be applied to the fibres simultaneously or separately. If they are applied simultaneously, this may be as a result of spraying onto the fibres a single liquid composition which comprises both binder components and wetting agent. Such a composition may, for instance, be produced before transport of the composition to the fibre production facility. Alternatively, the materials may be blended at the fibre production facility. As a further alternative, they may be blended in-line just before spraying takes place.

Alternatively, wetting agent and binder components may be applied separately but simultaneously to the fibres.

In general, application is usually by a spray into the spinning chamber into a cloud of the just-formed fibres. This results in distribution of the wetting agent on the surfaces of the fibres.

Example

The following is an example of a method of the invention as used for growing sweet pepper.

Plants were sown around October 1 in small plugs (height 2.5 cm and diameter 2 cm)—the first growth substrate—for germination.

Around October 15th seedlings and plugs were transplanted:

In a Traditional System
Plugs were transplanted into 10*10*6.5 cm blocks.
Around December $10^{th}$ blocks were transported to grower and planted.

In the System of the Invention
Plugs were transplanted into bigger plugs (height 6 cm and diameter 5 cm)—the second growth substrate.

Around halfway through November the bigger plugs were transplanted into units of third growth substrate (15*15*12 cm) with 1 plant per substrate unit.

Around January $5^{th}$ the units and plants were delivered to the grower.

The invention claimed is:

1. A method of growing a fruit or vegetable crop comprising:
   positioning a plant in the form of a seed or a seedling or a cutting of the crop in a first coherent mineral wool growth substrate having a volume not more than 150 $cm^3$;
   allowing the plant to root and grow for at least 2 days and not more than 30 day;
   transferring the plant within the first coherent mineral wool growth substrate so that the first coherent mineral wool growth substrate is in contact with a second coherent mineral wool growth substrate having volume 60 to 1500 $cm^3$; and allowing the plant to grow for a further 2 to 5 weeks;
   transferring the plant within the second coherent mineral wool growth substrate so that the second coherent mineral wool growth substrate is in contact with a third coherent mineral wool growth substrate having volume of from 700 to 45 000 $cm^3$; and
   allowing the plant to grow for a further 1 to 7 weeks before any further transfer is effected.

2. A method according to claim 1 in which the volume of the second coherent mineral wool growth substrate is in the range 70 to 500 $cm^3$.

3. A method according to claim 1 in which the volume of the second coherent mineral wool substrate is at least 110 $cm^3$.

4. A method according to claim 1 in which the volume of the third coherent mineral wool substrate is in the range 1000 to 8000 $cm^3$.

5. A method according to claim 1 in which the plant is allowed to root and grow in the first coherent mineral wool substrate for at least 8 days.

6. A method according to claim 1, comprising watering the plant at least 5 times during the first 7 weeks of growth.

7. A method according to claim 1 in which the third coherent mineral wool substrate has a height of at least 10 cm.

8. A method according to claim 1 in which the fruit or vegetable crop is selected from tomato, cucumber, pepper and eggplant.

9. A method according to claim 1 in which the contact between the first coherent mineral wool growth substrate and the second coherent mineral wool growth substrate is achieved by providing a cut-out in the second coherent mineral wool growth substrate into which a single first coherent mineral wool growth substrate is placed.

10. A method according to claim 1 in which the contact between the second coherent mineral wool growth substrate and the third coherent mineral wool growth substrate is achieved by providing a cut-out in the third coherent mineral wool growth substrate into which a single second coherent mineral wool growth substrate is placed.

11. A method according to claim 1 in which at least two second coherent mineral wool growth substrates are contacted with a single third coherent mineral wool growth substrate.

12. A method according to claim 1 in which the total time of growth of the plant in the first, second and third mineral wool growth substrates before any further transfer is effected is at least 5 weeks, preferably at least 11 weeks.

* * * * *